UNITED STATES PATENT OFFICE.

OTTO KIPPE, OF OSNABRÜCK, GERMANY, ASSIGNOR TO GENERAL BRIQUETTING COMPANY, OF NEW YORK, N. Y., A CORPORATION OF MAINE.

PROCESS OF MAKING BRIQUETS FROM ZINC ORES AND MATERIAL CONTAINING ZINC.

1,168,401.  Specification of Letters Patent.  Patented Jan. 18, 1916.

No Drawing.  Application filed November 19, 1914. Serial No. 872,890.

*To all whom it may concern:*

Be it known that I, OTTO KIPPE, a citizen of the German Empire, and a resident of Osnabrück, Germany, have invented a new, useful, and Improved Process of Making Briquets from Zinc Ores and Material Containing Zinc, of which the following is a specification.

In the production of spelter from zinc ores or the like by means of the known reduction and distillation processes, especially the recent method by which the zinc ores are smelted in the electric furnace, the so-called zinc dust or blue powder is given off in large amounts as a waste by-product. Moreover, in the refining of raw zinc or spelter, in the smelting of old spelter and in zincage or galvanizing processes, large amounts of waste in the form of zinc ash or zinc trimmings are produced. These waste products, which consist for the most part of a mixture of zinc oxid and finely divided metallic zinc, are of great value, but their fineness of division renders them generally unsuitable for smelting operations.

The present invention contemplates the utilization of this fine material in the production of briquets suitable for smelting, and the object of the invention is to produce such briquets by a technically simple and commercially practicable process which will hereinafter be set forth.

The basis of my invention may be said to be the discovery that when the above referred to finely divided zinc containing material is moistened with a dilute salt solution, the particles of said material are rendered coherent to a high degree. Briquets can be made in this way without the necessity of foreign binding means and, moreover, they possess great strength and are in every way suitable for smelting and this is true whether the briquet consists mainly of zinc waste or whether it is composed mainly of zinc ores or the like and contains a relatively small proportion of zinc waste. My process is, therefore, suitable not only for preparing zinc waste briquets but also for briqueting finely divided zinc ores, sufficient zinc by-product being added in the latter case so that the whole mass is rendered coherent. If pure zinc dust is moistened with pure water and then pressed into briquets, the briquets will soon expand, the expansion being accompanied by the evolution of heat, fractures will occur and the briquets shortly become wholly disintegrated. But if there is added to the mixing water a small amount, say ¼ to 2%, of a soluble salt, such as for example, the chlorid or sulfate of magnesium, calcium, iron or zinc (electrolytes), or even the free acids instead of the salts, the briquets give off heat and their particles become bound together so as to form within a few hours very hard stones. If the waste material, as is usually the case with zinc trimmings, already contains small amounts of these salts, a further addition of salt solution may not be necessary or may be necessary only to a slight degree. Instead of the pure salt solution there can be added successfully substances which in themselves contain such salts, as for example, roasted zinc blende or pyrite cinder. It is also permissible to incorporate with the zinc containing material the reducing materials ordinarily used in smelting, as anthracites, coke and the like.

The briqueting process is itself extremely simple. The material of the kind set forth is placed in a mixing machine together with reducing substances and the like, if desired, and is thoroughly mixed together therein in the presence of the water necessary for the compressing operation and the salt solution, when necessary; after mixing, the material is pressed to briquets by means of suitable press and the briquets are then stored for hardening. Their particles quickly become coherent, heat being evolved meanwhile, and the briquets are soon ready for smelting. The peculiar and extraordinary high binding or cohering power of these zinc containing materials, such as zinc dust, zinc ash and the like is of utility not only for producing briquets consisting primarily of such materials, but also for producing briquets of zinc ores and the like, in which case the zinc waste materials may be added to the ores in sufficient amount to serve only to bind the ore particles together.

Zinc ores and the like, such as are ordinarily available for smelting, are generally very finely divided and a briqueting process suitable for preparing said materials and fine ores for smelting operations is of great value. The above by-product materials form an industrially successful binding means for zinc ores and the like and is of especial value for such use because it is itself rich in zinc and therefore does not serve, as other binding materials do, as an adulterant of the ore; moreover the briqueting process is extremely simple.

The zinc ores to be briqueted are mixed with the zinc containing by-product such as zinc dust (of which 8 to 10% is sufficient) in a simple mixing machine, in the presence of sufficient moisture and of the requisite percentage of the salt (preferably in diluted state). This mixture is then pressed in an ordinary briqueting press. If the ores to be briqueted, as is the case, for example, with roasted zinc blende, already contain the soluble salt in the form of zinc sulfate, calcium sulfate, etc., a special addition of salt is, generally speaking, unnecessary. There can be mixed with the ore at the same time whatever reducing agents may be necessary, such as ground coke or anthracite, and any other material required for subsequent smelting operations. The briquets evolve heat and become hard in a short time if they are left to stand in the air; they possess strength and tenacity to a high degree and are ready for smelting without further treatment.

It is to be understood that besides this new binding means of zinc containing material there can be used in addition thereto any well known binding means when the latter contains soluble salts, as is the case for example with magnesia cement, cellulose-liquor and molasses. Moreover, the briquets, as well as the mixture, can be subjected to a treatment with steam and gases, such as is often employed in briqueting processes.

The peculiar and high binding powers of the zinc containing by-product material, as zinc dust, zinc ash, etc., in the presence of small amounts of salt is apparently due to the fact that in these substances there are present very fine particles of metallic zinc which are transformed by the water and the oxygen of the air into zinc hydroxid which intimately cements the substances to be bound together. The slight amount of salt serves in this process apparently only as an accelerator and can therefore be termed a catalyzer; and likewise the whole proceeding can be termed catalysis since the small amount of salt is not present in stoichiometric proportions with respect to the product formed.

I claim:

1. The hereindescribed process of producing briquets from finely divided zinc by-product material which consists in setting up binding conditions in said material by moistening said material with a liquid containing a chemically reactive dissolved salt, then compressing said moistened mass and evaporating the solvent, leaving the dry salt distributed in the mass without coöperating in the coherence of the mass.

2. The hereindescribed zinc-containing briquet comprising finely divided zinc by-product containing material, the particles of said material being bound together to form a hard, coherent mass, and a relatively small proportion of a water-soluble salt distributed throughout said mass as an ingredient which is inert with respect to the coherence of the particles.

In testimony whereof, I have hereunto set my hand in the presence of two subscribing witnesses.

OTTO KIPPE.

Witnesses:
WILHELM STRUP,
FREDERICK HOYERMANN.